(12) United States Patent
Soderberg

(10) Patent No.: US 8,635,802 B2
(45) Date of Patent: Jan. 28, 2014

(54) BOWFISHING REEL SEAT

(76) Inventor: Eric Christian Soderberg, Milaca, MN (US)

( * ) Notice: Subject to any disclaimer, the term of this patent is extended or adjusted under 35 U.S.C. 154(b) by 187 days.

(21) Appl. No.: 13/065,596

(22) Filed: Mar. 24, 2011

(65) Prior Publication Data

US 2011/0240811 A1    Oct. 6, 2011

Related U.S. Application Data

(60) Provisional application No. 61/341,703, filed on Apr. 2, 2010.

(51) Int. Cl.
*A01K 81/00*    (2006.01)
(52) U.S. Cl.
USPC .................................. 43/6; 43/22; 124/88
(58) Field of Classification Search
CPC ........................................................ A01K 87/06
USPC ............ 43/22, 25, 23, 6; 248/222.14, 222.52, 248/223.41, 224.51; 124/88; 473/576
See application file for complete search history.

(56) References Cited

U.S. PATENT DOCUMENTS

| | | | |
|---|---|---|---|
| 1,980,317 A | 11/1934 | Clark et al. | |
| 2,114,107 A * | 4/1938 | Holding | 43/22 |
| 2,479,952 A * | 8/1949 | Matson | 43/22 |
| 2,817,919 A | 12/1957 | Cress | |
| 3,084,467 A * | 4/1963 | Bromwell | 43/19 |
| 3,197,908 A | 8/1965 | Hirsch | |
| 3,589,350 A | 6/1971 | Hoyt, Jr. | |
| 4,127,956 A * | 12/1978 | Hertkorn | 43/19 |
| 4,651,461 A * | 3/1987 | Williams | 43/23 |
| 4,744,347 A * | 5/1988 | Dodge | 124/86 |
| 4,845,882 A * | 7/1989 | Collins | 43/22 |
| 4,891,899 A * | 1/1990 | Wulff | 43/22 |
| 4,955,356 A * | 9/1990 | Pike et al. | 124/89 |
| 5,038,510 A * | 8/1991 | Duke | 43/4 |
| 5,520,164 A * | 5/1996 | Huddleston | 124/86 |
| 5,553,413 A * | 9/1996 | Gannon | 43/6 |
| 7,086,195 B2 * | 8/2006 | Borgeat | 43/18.1 CT |

* cited by examiner

*Primary Examiner* — Terrell McKinnon
*Assistant Examiner* — Eret McNichols

(57) ABSTRACT

A reel seat (5) for affixing a fishing reel (80) to an archery bow (1) using a threaded fastener (16) attached to a support shaft (9). The foot (6) of the fishing reel (80) rests upon the shaft (9) and is secured between a cap (7) and a rear bushing (8). The rear bushing (8) is stationary while the cap (7) is movable along the shaft (9). Screwing a threaded fastener (23) into the shaft (9) advances the removable cap (7) towards the stationary rear bushing (8) and decreases the separation of the rear bushing (8) and the cap (7). The decreased distance results in physical forces and friction being applied to the reel foot, supporting member, and said structures. Prior to fully tightening the fastener (23), the fishing reel (80) may be placed in an infinite number of circumferential positions (90, 91, 92) with respect to the longitudinal axis (86) of the shaft (9).

7 Claims, 12 Drawing Sheets

BOWFISHING REEL SEAT

The present application claims priority from a provisional patent application entitled "Bowfishing Reel Seat", Ser. No. 61/341,703, filed on Apr. 2, 2010.

FIELD OF THE INVENTION

This invention relates generally to archery and more specifically to bowfishing reel seats that are employed when harvesting fish with a bow and arrow.

DESCRIPTION OF RELATED TECHNOLOGY

Bowfishing is the taking of fish by means of a bow and arrow. This ancient hunting technique is presently a popular and growing sport, a novel way to put food on the table, and a tool to aid in the reduction of unwanted or invasive fish species. State of the art bowfishing reel seats are derived from a variety of previous devices. U.S. Pat. No. 1,980,317, (Clark et al.), discloses a fishing reel secured with a movable sleeve. While suitable for use on a fishing rod, the Clark et al. device is unsuitable for bowfishing applications. The movable sleeve of Clark et al. is constrained to a fixed longitudinal axis and is only capable of sliding along the shaft and not rotatably about the shaft itself. The Clark et al. sleeve is threaded and requires a mating coupler, thereby increasing the cost and weight of the device.

U.S. Pat. No. 3,197,908 (Hirsch), discloses a reel seat fastening scheme while U.S. Pat. No. 3,589,350 (Hoyt) discloses an attachment mechanism for use with an archery bow. These devices require the use of locking rings which can result in unwanted movement of the reel and which cannot be sufficiently tightened without causing damage to one or more parts of the reel seat. A further disadvantage is the use of jamb nuts which can easily loosen. The jamb nuts create a weakened region and also increase the overall length of the reel seat.

SUMMARY OF THE INVENTION

The present invention is intended to address some of the deficiencies of current bowfishing reel seats. The invention is removable and may be readily remounted at any position around the axial periphery of a cylindrical shaft. The cylindrical shaft includes internally threaded bores at each end with one end having machined flats to aid in fastening a protruding threaded fastener. A cylindrical bored bushing with an internal tapered portion may be fastened adjacent to the machined flats with the larger internal tapered opening facing away from the flats. A portion of the cylindrical shaft extends beyond the bushing. At one end of the cylindrical shaft a cap is slidably attached. The cap has both a terminating bore which mates with the cylindrical shaft as well as an internal taper which extends away from the terminating bore. The cap also has a smaller axial bore through which a fastener may pass and mate with the corresponding thread of the cylindrical shaft. An additional feature is an extended cap which can be used instead of the aforementioned cap. The extended cap provides a region to wrap or store bowfishing line.

DETAILED DESCRIPTION OF THE INVENTION

Figure 1:
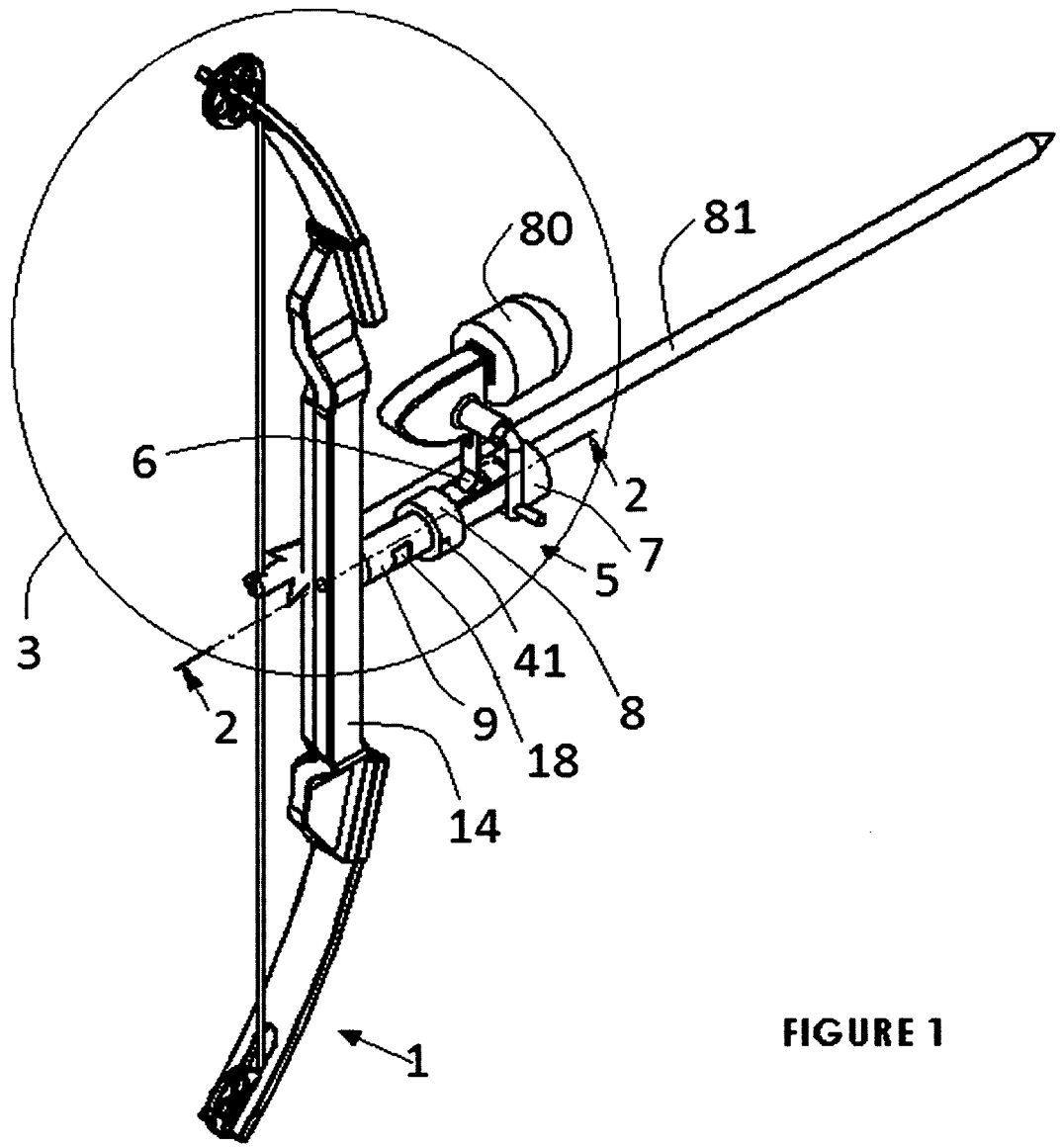
FIG. 1 is a perspective view of the present invention shown with a fishing reel attached and mounted to an archery bow.

Referring to FIG. 1, a riser 14 of an archery bow 1 is shown. Attached to the riser 14 is a bowfishing reel seat 5 constructed according to the principles of the present invention. A fishing reel 80 is mounted on the reel seat 5. The reel 80 contains bowfishing line which is attached to the arrow 81 by means which are well known in the bowfishing field.

Figure 2:
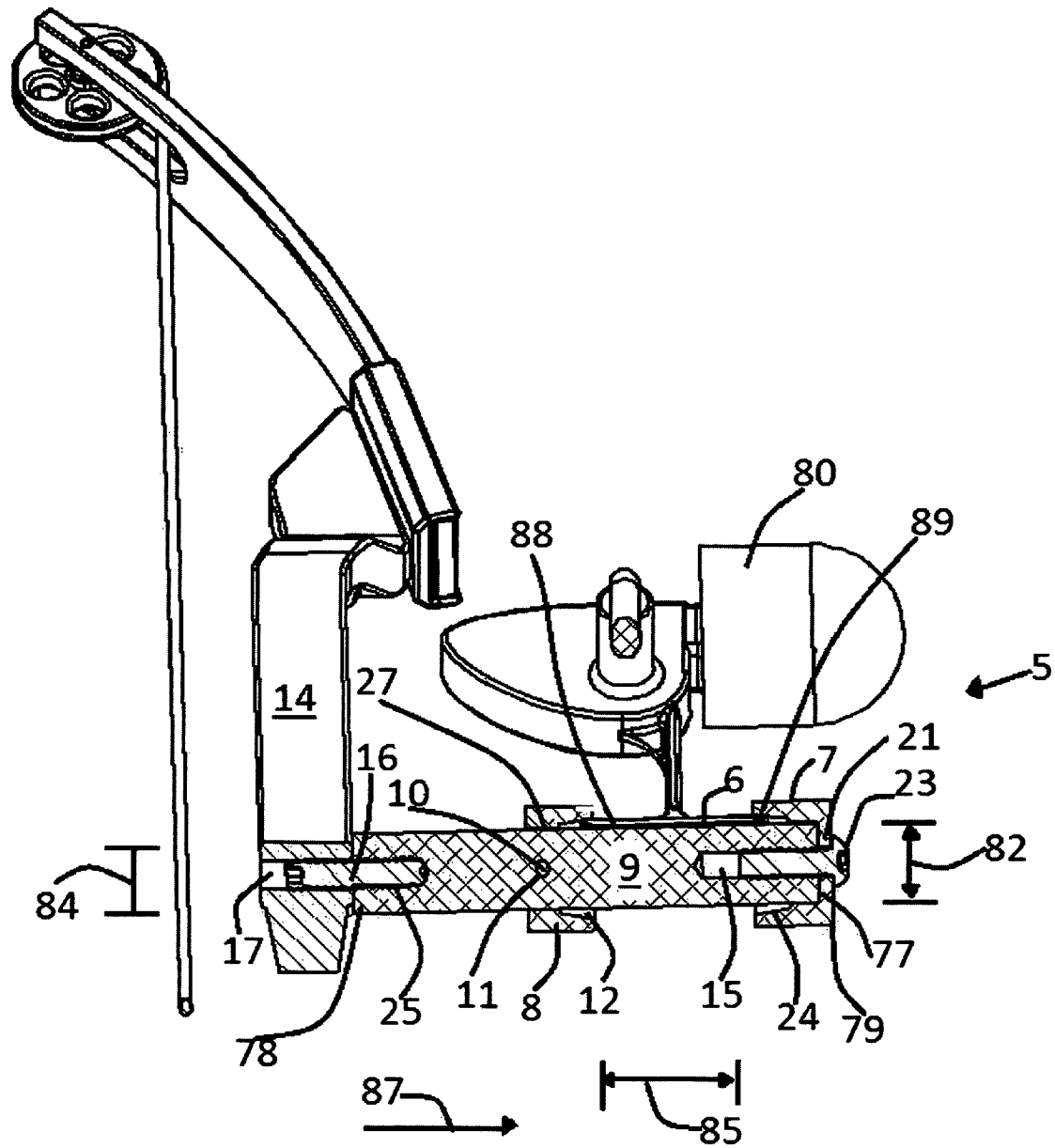
FIG. 2 is a sectional view taken along lines 2-2 within the region 3, with some elements omitted for clarity, as depicted in FIG. 1.

Referring to FIG. 2, the reel seat 5 is seen to include a longitudinal supporting shaft 9, having a diameter 82 of approximately 0.875 inches. The shaft has a first end 77 and a second end 78. The reel seat 5 includes opposing axially bored and threaded terminating holes or bores, the bore 15 being formed in the first end 77 and the bore 25 being formed in the second end 78. The bore 15 accepts a cooperating threaded fastener 23 and bore 25 accepts a threaded stud 16. A standardized 5/16"×24 NF threaded stabilizer bore 17 already present in the bow riser 14 accepts the cooperating threaded fastener 16, which may be fastened to the axially threaded hole 25 of the reel seat 5. Inserting the fastener 16 into the threaded bore 25 permits protrusion of a portion of the threaded fastener 16 beyond the shaft 9, thereby permitting fastener 16 to be screwed into the threaded stabilizer bore 17 of the bow riser 14. The fastener 16 thereby supports shaft 9 of the reel seat 5 and causes reel seat 5 to contact and substantially bear upon the riser body 14. The opposing flat surfaces 18 seen in FIG. 1 that are formed within the surface of shaft 9 provide a means to rotate the shaft 9 by cooperating mechanical means such as a wrench so as to substantially increase or decrease the contact area and subsequent friction between the shaft 9 and the riser body 14.

Forward of the flat surfaces 18 may be fastened or secured the rear bushing 8 which is slideable upon the supporting shaft 9, the diameter 84 of the bushing 8 being approximately 0.001 to 0.004 inches greater than the diameter 82 of shaft 9. Forward of the rear bushing 8 is the cap 7 which is fastened to the supporting shaft 9 by threaded fastener 23 which passes through the axial borehole 21 formed in the top region 79 of the cap 7. The axial threaded bore 15 of the supporting shaft 9 accepts the cooperating threaded fastener 23 to secure cap 7.

The reel foot 6, being part of the reel 80, is captured by the rear bushing 8 and the cap 7 and rests upon the supporting shaft 9. By screwing threaded fastener 23 through cap 7 and into the threaded bore 15, the reel foot 6 is pushed further into the secured rear bushing 8 and the correspondingly shaped internal radial taper 12 of approximately nine degrees. The cap 7 is formed to include a correspondingly shaped internal surface 24 also having a nine degree taper. The cap 7 and the rear bushing 8 have substantially identical internal shapes and dimensions. The compression force created on the cap 7 by fastener 23 within the threaded bore 15 secures the reel foot 6 between the cap 7 and the rear bushing 8.

Figure 3:
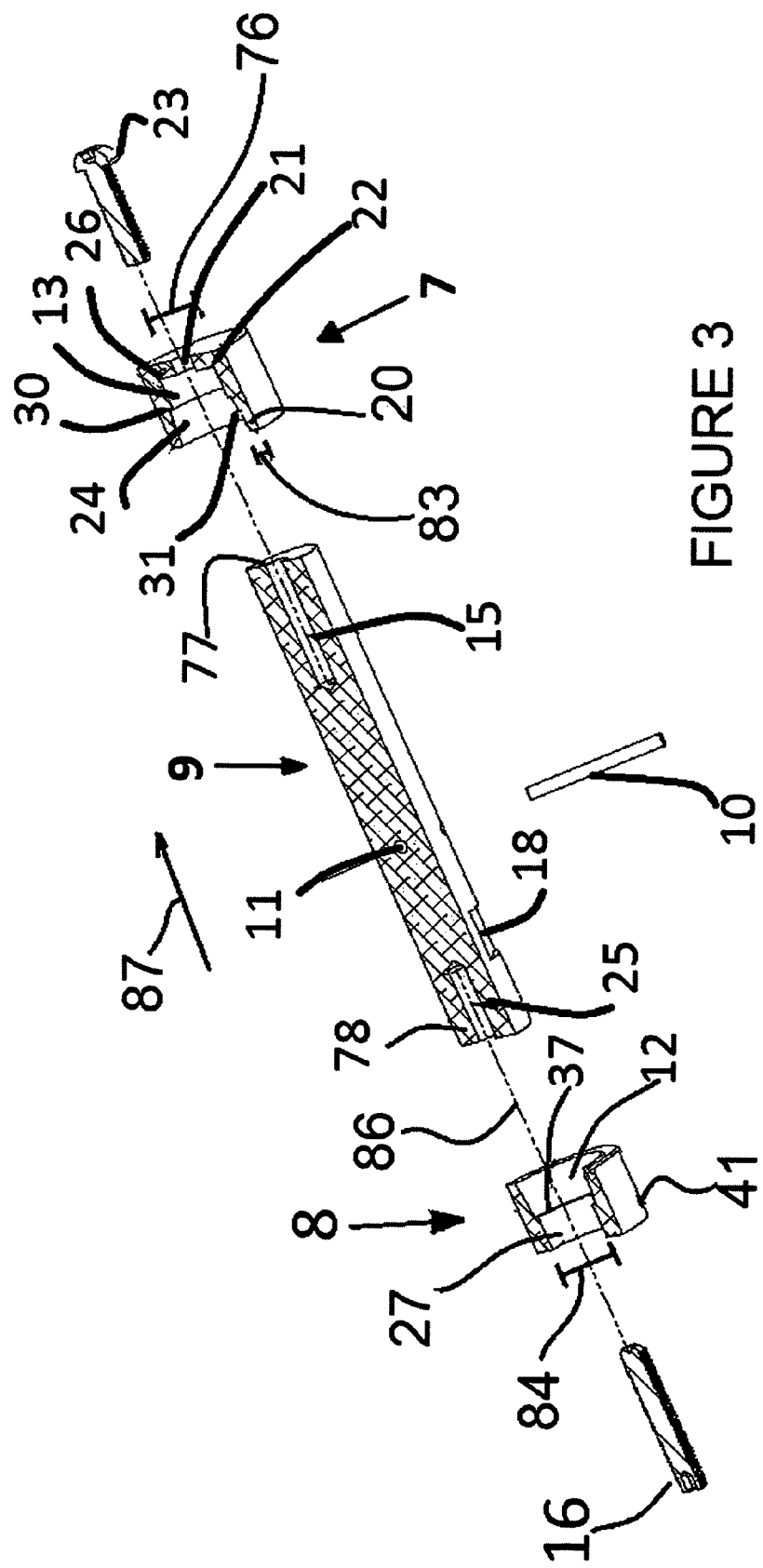
FIG. 3 is an exploded cross-sectional view of the invention as illustrated in FIG. 2.
Figure 4:
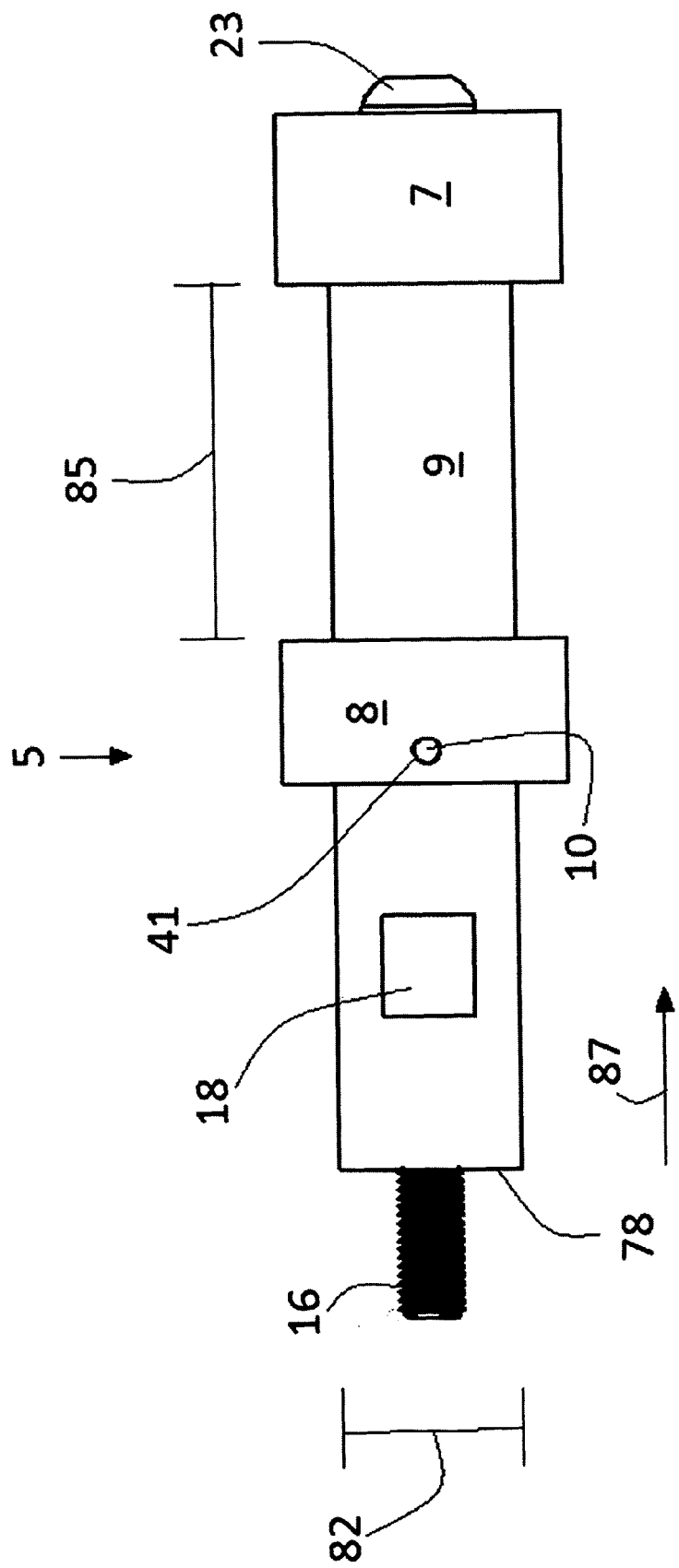
FIG. 4 is a side elevation of the invention of as illustrated in FIG. 1.

Referring also to FIG. 3, the tapering internal surface 24 originates at lower circumferential wall 20 where the wall thickness 83 is approximately 0.136 inches and continues approximately 0.350 inches until terminating at shoulder 30. The axial bore 13 of the cap 7 has a diameter 76, the axial bore 13 terminating at corner 22 a distance of approximately 0.320 inches from shoulder 30 so as to accept and retain a portion of the supporting shaft 9. At the terminal end 22 of said cap 7 is a diametrically smaller axial bore 21 through which a threaded fastener 23 may be inserted. The thickness of wall 26 surrounding the axial bore 21 is approximately 0.150 inches. The fastener 23 screws into the threaded axial bore 15 of the supporting shaft 9. A gap or space 85 is provided between the cap 7 and the rear bushing 8 along the longitudinal axis 86 of the supporting shaft 9. In the preferred embodiment, the rear bushing 8 is slideable along the supporting shaft 9 through an axial bore 27 having a diameter 84 that is slightly greater than the diameter 82 of the supporting shaft 9. The rear bushing preferentially has an internal tapered wall 12 terminating adjacent to shoulder 37 of the axial bore 27. A cross hole 41 bisects the rear bushing 8. The supporting shaft 9 is bisected by at least one similarly sized cross hole 11. A fastener pin 10 extends through the cross hole 41 and one of the available cross holes 11 that have been formed through the shaft 9.

Figure 9:
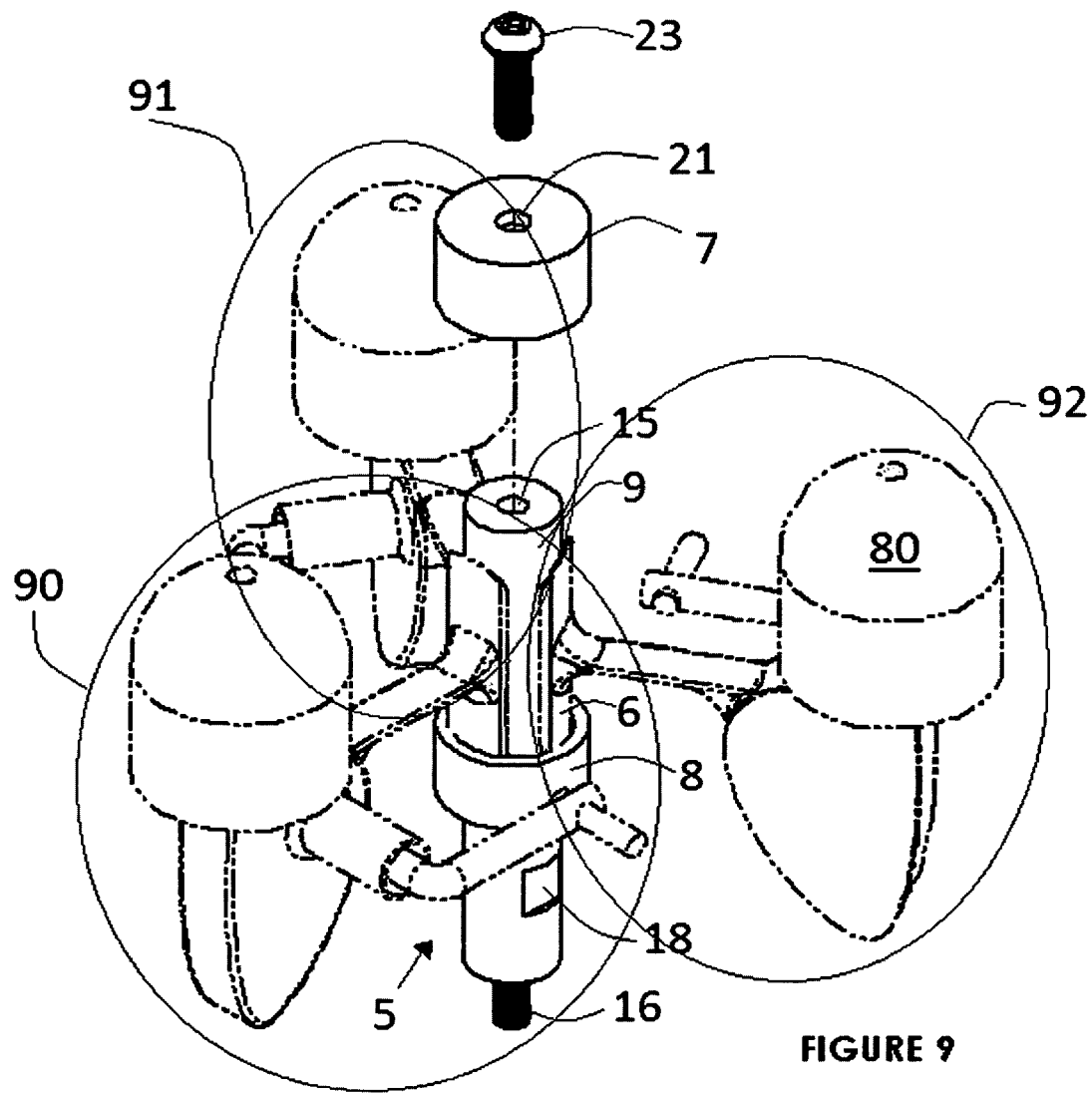
FIG. 9 is an isometric view of the present invention during assembly with alternate positions of a reel shown in phantom.
Figure 10:
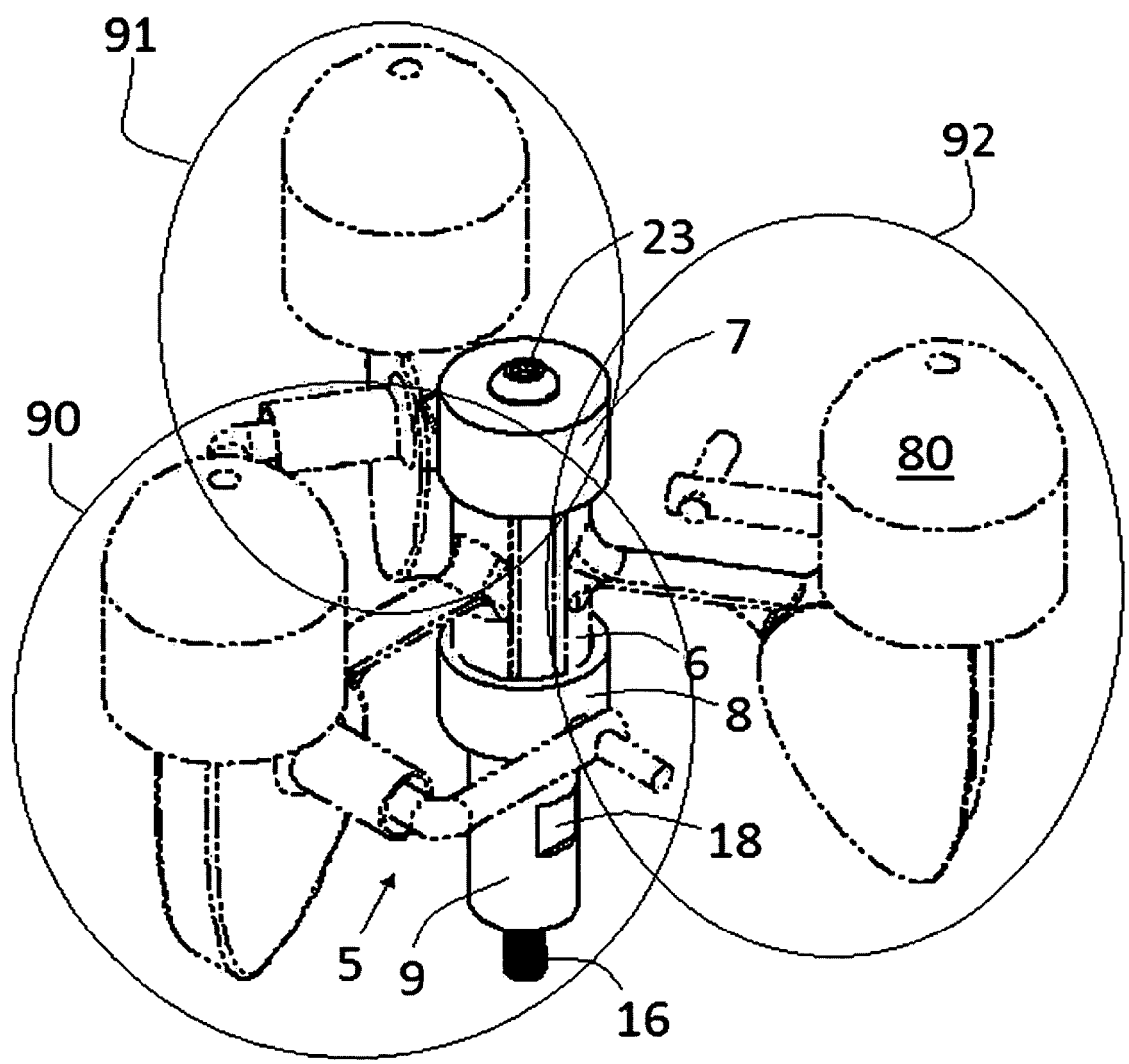
FIG. 10 is an isometric view of the present invention after assembly of components depicted in FIG. 9 is completed.
Figure 11:
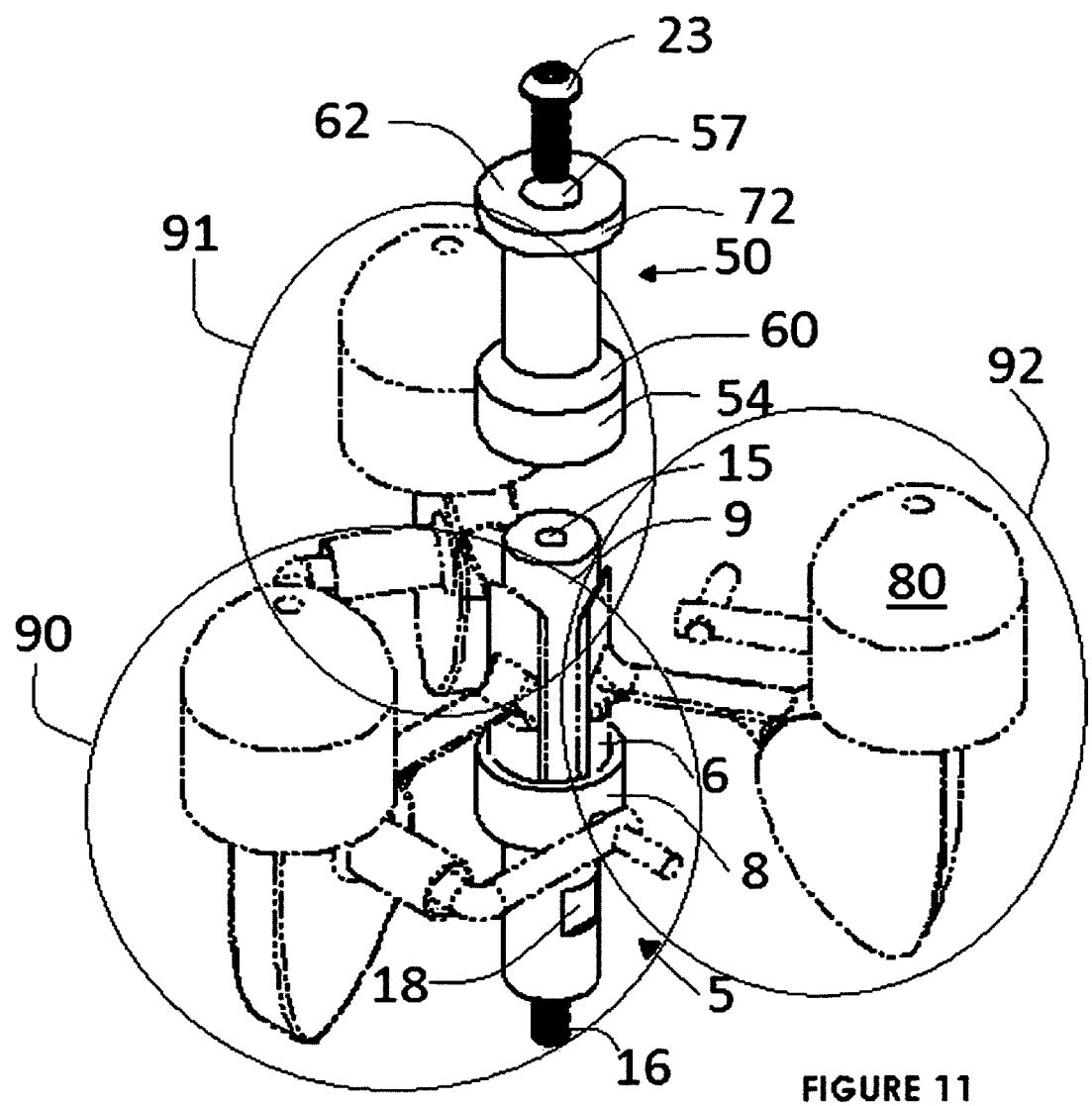
FIG. 11 is an isometric view of the extended accessory cap depicted in FIG. 5 as seen during assembly with alternate positions of a reel shown in phantom.
Figure 12:
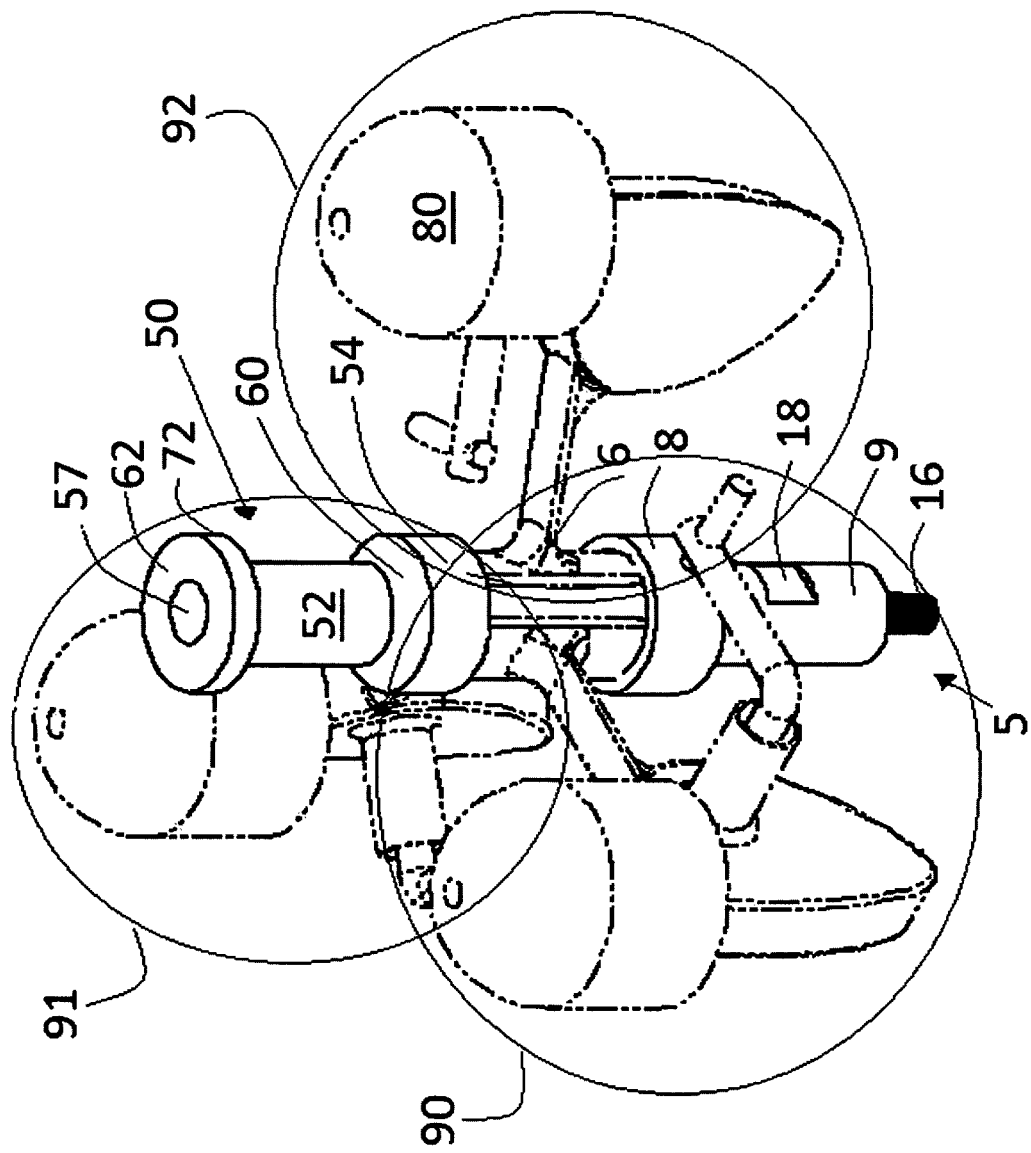
FIG. 12 is an isometric view of accessory extended cap after assembly of components depicted in FIG. 11 is completed.

In use, the shaft 9 is typically grasped with one hand, and the riser 14 of the bow 1 is grasped with the other hand. The threaded fastener 16 is screwed into the cooperating threaded stabilizer hole 17 of bow riser 14 and tightened by hand. A wrench is then applied to the flat surfaces 18 of the supporting shaft 9 for final tightening. The threaded fastener 23 is then sufficiently loosened to allow the cap 7 to slide along the supporting shaft 9 in the direction of arrow 87 and away from stationary rear bushing 8. A first region 89 of the reel foot 6 is then inserted into the tapered portion 24 of the cap 7. The reel foot 6 is then able to rest upon the supporting shaft 9 and a second region 88 of the reel foot 6 can slide into the tapered portion 12 of the stationary rear bushing 8. After sliding cap 7 back into contact with the first portion 89 of the reel foot 6, the threaded fastener 23 may be lightly tightened and reel 3 may be rotated into a desired position, such as positions 90, 91 and 92 as illustrated, for example, as shown in FIG. 9, or any circumferential position on the supporting shaft 9. The fastener 23 is then tightened sufficiently to prevent movement of the reel 80.

Figure 5:
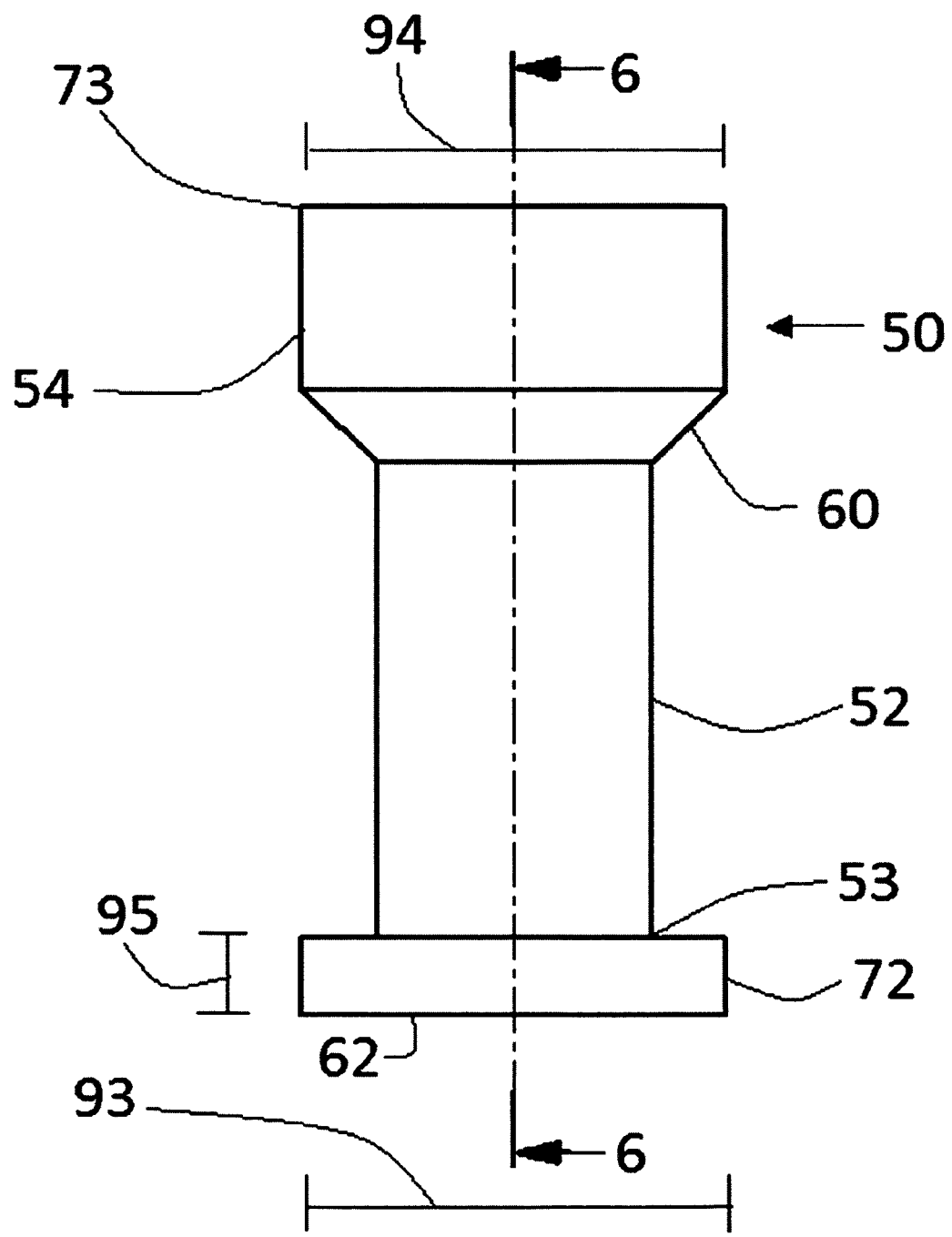
FIG. 5 is a side elevation of an accessory extended cap that may be used in conjunction with the invention depicted in FIG. 1.

FIG. 5 depicts an accessory extended cap 50 having a proximal end 73 and distal end 62, "proximal" and "distal" referring to their relationship to a user of the cap 50. The cap 50 includes an annular flange 72 having a diameter 93. The height 95 of flange 72 is approximately 0.250 inches. The flange 72 is integrally formed with a diametrically smaller cylindrical column 52 which abuts a tapered region 60. Abutting the tapered region 60 is an annular section 54 having a diameter 94 that is substantially equal to diameter 93.

Figure 6:
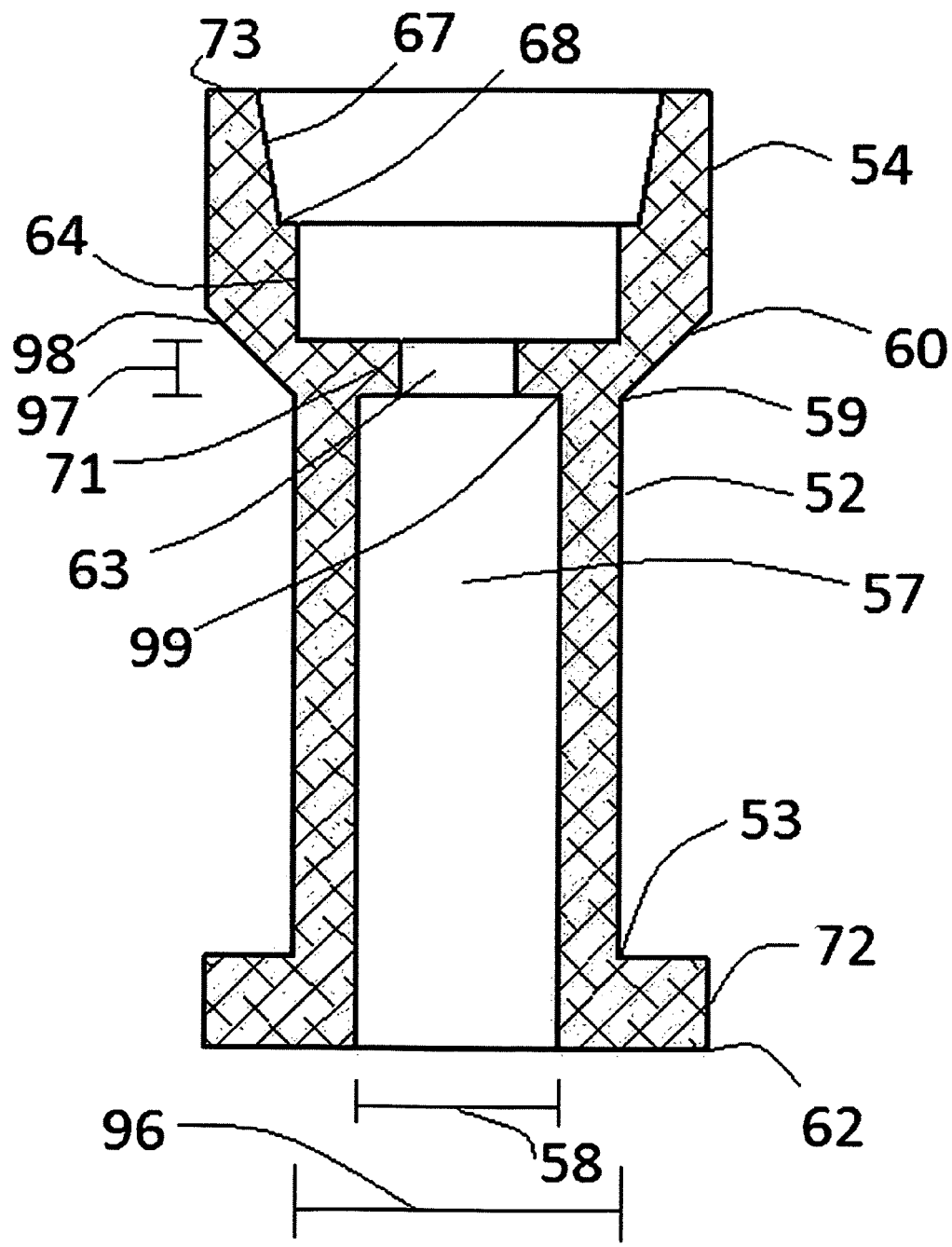
FIG. 6 is a cross-section of the accessory extended cap taken along line 6-6 as shown in FIG. 5.
Figure 7:
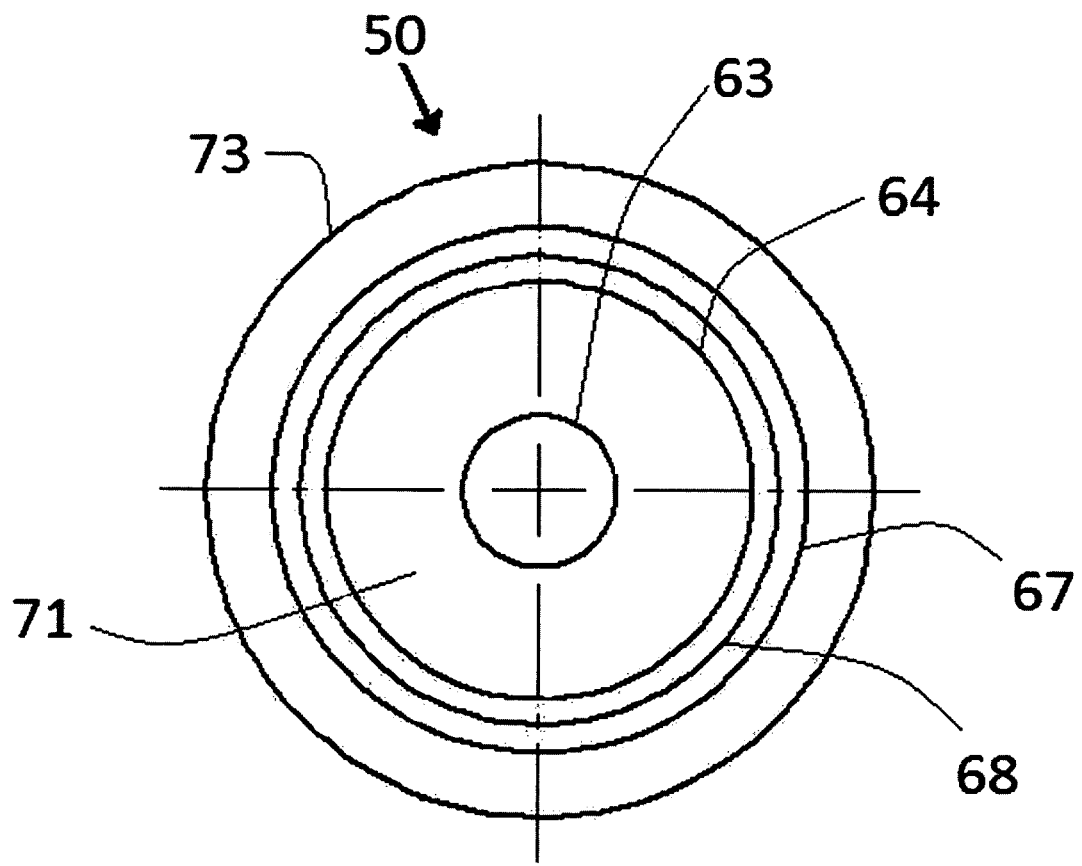
FIG. 7 is a top plan view of the accessory extended cap shown in FIG. 5.
Figure 8:
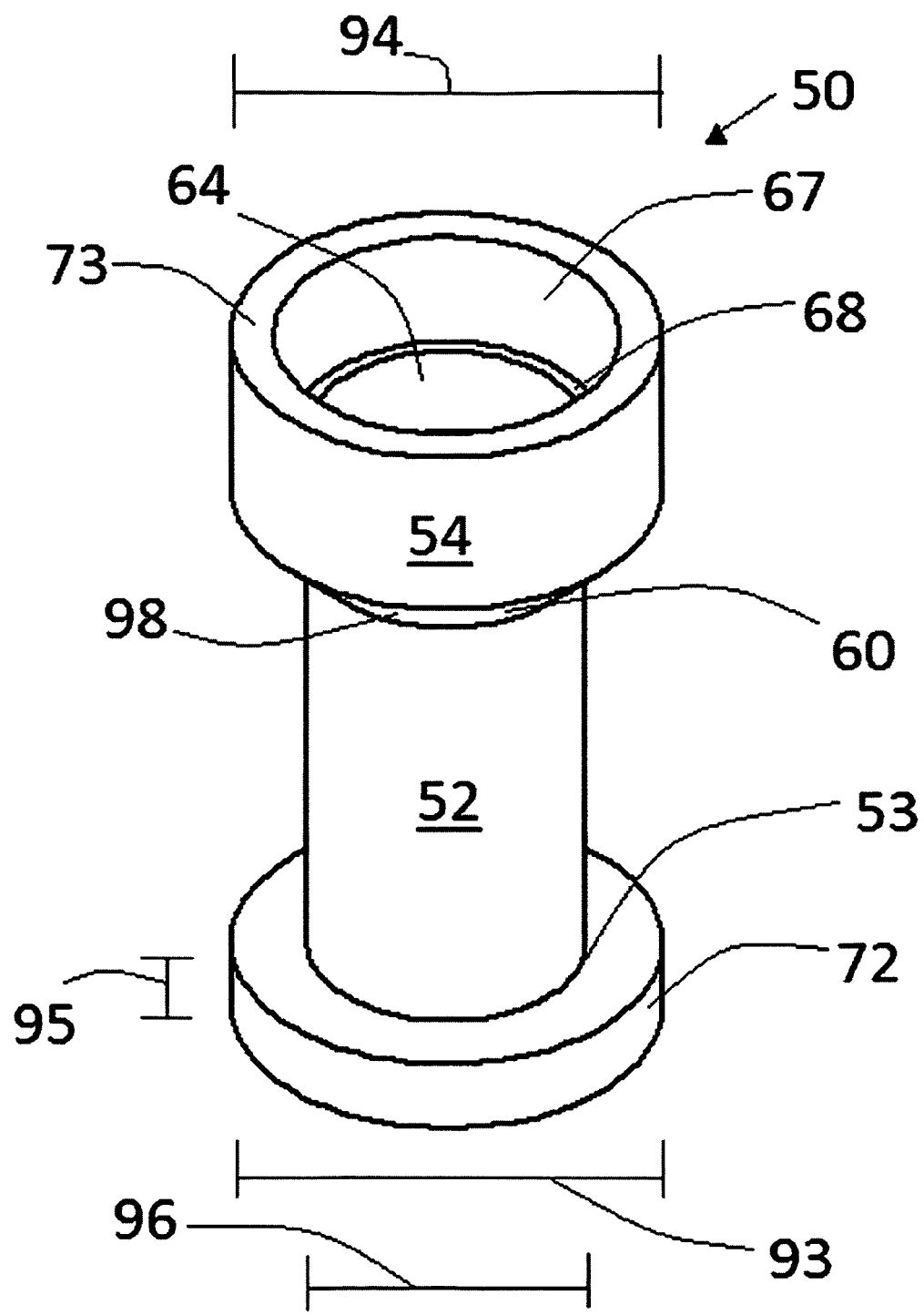
FIG. 8 is an isometric view of the accessory extended cap shown in FIG. 5.

Referring also to FIGS. 6, 7 and 8, intersecting the annular flange 72 at shoulder junction 53 is a substantially cylindrical column 52 having a constant diameter 96 that is less than diameter 93. An axial bore 57 having a diameter 58 passes from the distal end 62 to a shoulder junction 99 with an annular flange 71 having a height 97 of approximately 0.1875 inches. Tapered section 60 abuts shoulder junction 59, forming an angle 98 of approximately forty five degrees. Formed within the annular section 54 is tapered surface 67 which terminates at lip 68 which abuts an axial bore 64. The axial bore 64 fits over the supporting shaft 9 with a clearance of approximately 0.0025 inches.

Referring now to FIGS. 9, 10, 11 and 12, fastener 23 is shown above the cap 7 and passes freely through the axial bore 21 of cap 7 to mate with threaded axial bore 15 of the supporting shaft 9. The cap 7 fits over the shaft 9. The reel foot 6 is captured between the cap 7, supporting shaft 9, and the rear bushing 8. Fastener 23 urges the cap 7 toward bushing 8, bearing upon and thereby abutting the reel foot 6 and urging the reel foot 6 into a secure relationship with the tapered portion 12 of the rear bushing 8. The accessory extended cap 50 may be used interchangeably as a replacement for the cap 7. When using cap 50, fastener 23 passes freely through axial bore 57 and mates with the threaded axial bore 15 of the supporting shaft 9.

The terminology, descriptions and drawings of the reel seat do not limit its usefulness, but embrace all materials, modifications and variations within the scope of the claims.

I claim:

1. A reel seat for affixing a fishing reel to an archery bow, the reel seat comprising:
   (a) a shaft extending continuously between a proximal end adapted to be affixed to an archery bow and a distal end, the shaft defining a shaft diameter, a first portion that is substantially smooth and cylindrical in shape and is located toward the distal end of the shaft, and a second portion that is substantially smooth and cylindrical in shape and is located toward the proximal end of the shaft, the shaft comprising a first borehole formed in a first end of the shaft and a second borehole formed in a second end of the shaft, the second borehole being adapted to accept a threaded stud adapted to mate with a portion of the archery bow;
   (b) a cap adapted to be received over the first portion of the shaft and affixed to the shaft, the cap defining an interior region adapted to receive a first end region of a reel foot of a fishing reel between the cap and the shaft such that the reel foot is affixed to the reel seat between the cap and the shaft upon securing the cap to the distal end of the shaft, the cap comprising,
   (i) a to region,
   (ii) a first borehole formed through the to region of the cap so as to permit a fastener to be affixed to the cap, the first borehole of the shaft being substantially aligned with the first borehole formed in the top region of the cap when the cap is placed onto the shaft,
   (iii) a lower circumferential wall, the lower circumferential wall defining a tapered region adapted to accept the first end region of the reel foot;
   (iv) a shoulder, the shoulder defining a boundary of the lower circumferential wall, and
   (v) a cap axial bore, the cap axial bore abutting the lower circumferential wall at the shoulder, the cap axial bore having a cap axial bore diameter that is greater than the shaft diameter, thereby permitting the axial bore to slide over the shaft; and
   (c) a rear bushing adapted to be slideably received over and secured about the second portion of the shaft, the rear bushing forming an interior region that combines with the shaft to define a circumferential opening adapted to receive a second end region of a reel foot of a fishing reel between the rear bushing and the shaft such that the second end region of the reel foot is free to move circumferentially about the shaft when received in the circumferential opening to adjustably position the reel at a desired circumferential position about the shaft prior to fixedly securing the cap to the shaft, the rear bushing being adapted to grip the second end region of the fishing reel foot after securing the cap such that the fishing reel is rigidly affixed to the shaft, the interior region of the cap being adapted to grip a first end region of a reel foot of the fishing reel and the interior region of the rear bushing being adapted to grip the second, opposite end region of the reel foot; and (d) a first threaded fastener, the first threaded fastener being adapted to pass through the first borehole formed in the top region of the cap and the first borehole formed in the shaft so as to rigidly affix the cap to the shaft.

2. The reel seat of claim 1, wherein the rear bushing further comprises:
(a) a bushing axial bore, the bushing axial bore having a bushing axial bore diameter that is greater than the shaft diameter;
(b) a shoulder, the shoulder defining a boundary of the bushing axial bore; and
(c) a tapered wall, the tapered wall abutting the shoulder, the tapered wall defining a region adapted to accept the second region of the reel foot.

3. The reel seat of claim 2, wherein the rear bushing further comprises a bushing cross bore, the bushing cross bore being substantially perpendicular to a longitudinal axis of the shaft.

4. The reel seat of claim 3, wherein the shaft further comprises at least one shaft cross bore, the rear bushing being slideable along the shaft such that the bushing cross bore can be aligned with the shaft cross bore, thereby permitting the placement of a single pin through the shaft cross bore and the bushing cross bore so as to secure the rear bushing onto the shaft in a fixed position.

5. The reel seat of claim 4, wherein the shaft further comprises a plurality of shaft flats located proximal the rear bushing, the shaft flats being located in substantially diametrically opposed surface regions, the shaft flats being adapted to mate with a wrench in order to facilitate rotation of the shaft.

6. A reel seat for affixing a fishing reel to an archery bow, the reel seat comprising:
a shaft extending continuously between a proximal end adapted to be affixed to an archery bow and a distal end, the shaft defining a shaft diameter, a first portion that is substantially smooth and cylindrical in shape and is located toward the distal end of the shaft, and a second portion that is substantially smooth and cylindrical in shape and is located toward the proximal end of the shaft, the shaft further comprising a first borehole formed in a first end of the shaft and a second borehole formed in a second end of the shaft, the second borehole being adapted to accept a threaded stud adapted to mate with a portion of the archery bow;
a cap adapted to be received over the first portion of the shaft and affixed to the shaft, the cap defining an interior region adapted to receive and grip a first end of a reel foot of a fishing reel between the cap and the shaft such that the reel foot is affixed to the reel seat between the cap and the shaft upon securing the cap to the distal end of the shaft, wherein the cap comprises a top region and a first borehole formed through the top region of the cap such that the first borehole of the shaft is substantially aligned with the first borehole of the cap when the cap is placed onto the shaft so as to permit a fastener to affix the cap to the shaft using the first borehole of the cap and the first borehole of the shaft, a lower circumferential wall defining a tapered region adapted to accept the first region of the reel foot, a shoulder defining a boundary of the lower circumferential wall, and a cap axial bore, the cap axial bore abutting the lower circumferential wall at the shoulder, the cap axial bore having a cap axial bore diameter that is greater than the shaft diameter such that the axial bore is adapted to slide over the shaft; and
a rear bushing received over and secured about the second portion of the shaft, the rear bushing forming an interior region that combines with the shaft to define a circumferential opening adapted to receive and grip a second end of a reel foot of a fishing reel between the rear bushing and the shaft such that the second end of the reel foot is free to move circumferentially about the shaft when received in the circumferential opening to adjustably position the reel at a desired circumferential position about the shaft prior to fixedly securing the cap to the shaft such that the fishing reel is rigidly affixed to the shaft; and
a first threaded fastener, the first threaded fastener being adapted to pass through the first borehole formed in the top region of the cap and the first borehole formed in the shaft so as to rigidly affix the cap to the shaft.

7. A method of affixing a reel to a fishing bow, the method comprising:
providing a reel seat comprising:
a shaft extending continuously between a proximal end adapted to be affixed to an archery bow and a distal end, the shaft defining a shaft diameter, a first portion that is substantially smooth and cylindrical in shape and is located toward the distal end of the shaft, and a second portion that is substantially smooth and cylindrical in shape and is located toward the proximal end of the shaft, the shaft further comprising a first borehole formed in a first end of the shaft and a second borehole formed in a second end of the shaft, the second borehole being adapted to accept a threaded stud adapted to mate with a portion of the archery bow;
a cap adapted to be received over the first portion of the shaft and affixed to the shaft, the cap defining an interior region adapted to receive and grip a first end of a reel foot of a fishing reel between the cap and the shaft such that the reel foot is affixed to the reel seat between the cap and the shaft upon securing the cap to the distal end of the shaft, wherein the cap comprises a top region and a first borehole formed through the top region of the cap such that the first borehole of the shaft is substantially aligned with the first borehole of the cap when the cap is placed onto the shaft so as to permit a fastener to affix the cap to the shaft using the first borehole of the cap and the first borehole of the shaft, a lower circumferential wall defining a tapered region adapted to accept the first region of the reel foot, a shoulder defining a boundary of the lower circumferential wall, and a cap axial bore, the cap axial bore abutting the lower circumferential wall at the shoulder, the cap axial bore having a cap axial bore diameter that is greater than the shaft diameter such that the axial bore is adapted to slide over the shaft; and
a rear bushing received over and secured about the second portion of the shaft, the rear bushing forming an interior region that combines with the shaft to define a circumferential opening adapted to receive and grip a second end of a reel foot of a fishing reel between the rear bushing and the shaft such that the second end of the reel foot is free to move circumferentially about the shaft when received in the circumferential opening to adjustably position the reel at a desired circumferential position about the shaft prior to fixedly securing the cap to the shaft such that the fishing reel is rigidly affixed to the shaft; and a first threaded fastener, the first threaded fastener being adapted to pass through the first borehole formed in the top region of the cap and the first borehole formed in the shaft so as to rigidly affix the cap to the shaft; and affixing the reel to the fishing bow using the reel seat.

* * * * *